United States Patent [19]

Semenenko

[11] Patent Number: 5,622,291
[45] Date of Patent: Apr. 22, 1997

[54] MATERIAL TRANSFER APPARATUS WITH EXTENSIBLE CONDUIT

[75] Inventor: Ivan Semenenko, Gloucestershire, England

[73] Assignee: Matcon Limited, Gloucestershire, United Kingdom

[21] Appl. No.: 469,910

[22] Filed: Jun. 6, 1995

[30] Foreign Application Priority Data

Jun. 7, 1994 [GB] United Kingdom ............ 9411376

[51] Int. Cl.⁶ .................................................. B67D 3/00
[52] U.S. Cl. ........................... 222/527; 222/529; 141/264
[58] Field of Search ................................ 222/527, 529; 141/263, 264; 137/592

[56] References Cited

U.S. PATENT DOCUMENTS

| 2,223,854 | 12/1940 | Peaster | 222/529 X |
| 3,005,473 | 10/1961 | Ring | 141/264 X |
| 5,016,686 | 5/1991 | Gerstenkorn | 141/96 |
| 5,082,236 | 1/1992 | Wiese | 251/5 |

FOREIGN PATENT DOCUMENTS

| 369324 | 3/1932 | United Kingdom . |
| 2268164 | 1/1994 | United Kingdom . |
| WO89/01453 | 2/1989 | WIPO . |

Primary Examiner—Andres Kashnikow
Assistant Examiner—Kenneth Bomberg
Attorney, Agent, or Firm—Shapiro and Shapiro

[57] ABSTRACT

There is provided apparatus for transferring material from one container to another, comprising an extensible conduit, a mechanism to extend the conduit, and respective mechanism to open and close an inlet and outlet of the conduit, the arrangement being such that in use the conduit is extended for transfer of material, and the inlet and outlet are opened sequentially to pass material to the conduit from the owe container and then from the conduit to another container.

20 Claims, 6 Drawing Sheets

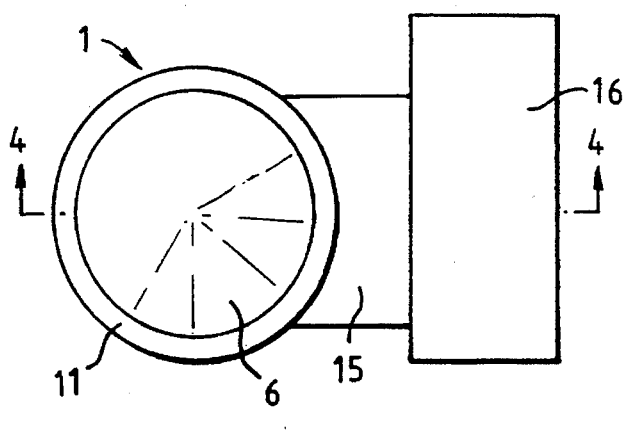
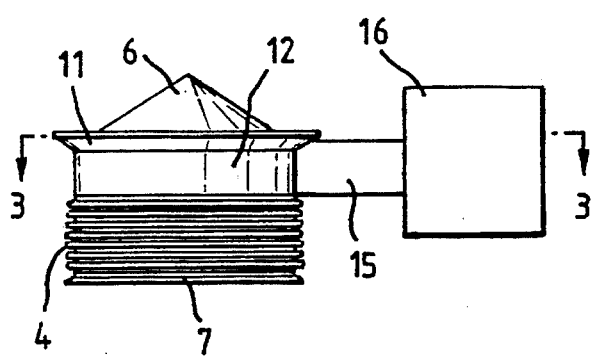
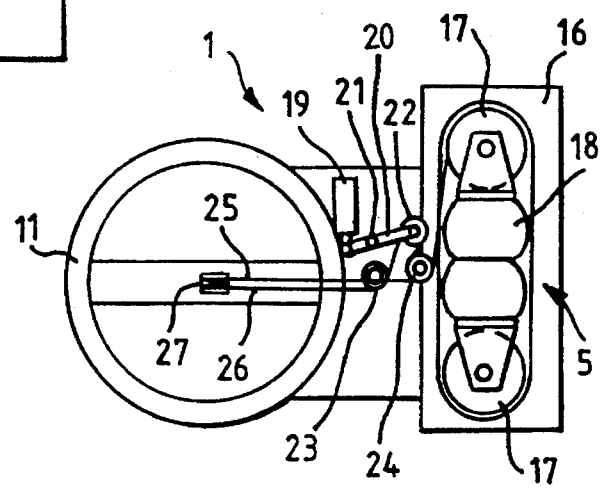
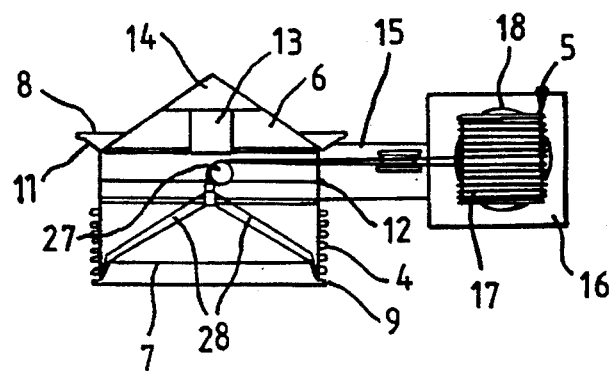

MATERIAL TRANSFER APPARATUS WITH EXTENSIBLE CONDUIT

The invention relates to material handling apparatus, particularly to such an apparatus for transferring material from one container to another.

It is often necessary to fill material from one bulk storage vessel or process vessel to another. Such transfer should be achieved without damage to the material, which can for example be finished tablets which have to be transferred from a say tablet press which makes them to an intermediate bulk container (IBC). However, such tablets are often friable, or "green", and if they are allowed to fall more than a few centimeters they tend to break, and are thus wasted. To avoid this, the pharmaceutical industry for example tends to use very small containers to reduce the height of fall but this reduces capacity, is expensive and tends to be relatively manually intensive, again increasing costs.

It is accordingly an object of the invention to seek to mitigate these disadvantages.

According to a first aspect of the invention there is provided apparatus for transferring material from one container to another, comprising an extensible conduit, means to extend the conduit, and respective means to open and close an inlet and outlet of the conduit, the arrangement being such that in use the conduit is extended for transfer of material, and the inlet and outlet are opened sequentially to pass material to the conduit from the one container and then from the conduit to the another container.

The means to open and close the inlet and outlet may comprise a respective valve at each of the inlet and outlet. This provides a relatively simple and controllable apparatus.

The said means may also comprise a control means to maintain the outlet valve at the desired position and to raise the conduit from the outlet valve thereby to open a discharge opening therebetween.

The control means may comprise a pulley block and an actuator for moving sheaves of the block towards and away from each other for adjusting the position of the conduit outlet and the outlet valve by respective flexible connectors.

The flexible connectors may lie substantially along the longitudinal axis of the conduit.

The flexible connector for the conduit outlet may comprise three equiangularly arranged connectors connected between a relatively rigid rim of the outlet and as axial flexible connector.

The rim may comprise a wire reinforced rim of the conduit.

The flexible connectors may comprise nylon ropes or strings.

The flexible connector for the conduit outlet may be trained around a pulley which is adjustable in position, effectively to shorten the flexible connector and raise the outlet from the outlet valve.

The pulley may be connected to a further actuator for positional adjustment.

The further actuator may comprise a piston and cylinder arrangement.

The actuator for the pulley block may comprise a bellows means. The bellows means may comprise a double bellows.

The flexible conduit may comprise a reinforced flexible piping.

There may be adjacent the inlet a flange means for connection of the inlet with an outlet of the one container.

The respective inlet and outlet valves may comprise cone valves, which may preferably be non-metallic.

The inlet cone valve may comprise an actuator to move the valve means for opening and closing the inlet. The actuator may comprise a piston and cylinder arrangement.

The piston and cylinder arrangement may include a vibrator means.

According to a second aspect of the invention there is provided apparatus as hereinbefore defined, positioned between the outlet of the one container and the inlet of another container.

The another container may comprise an intermediate bulk container.

The one container may comprise an intermediate bulk container.

According to a third aspect of the invention there is provided apparatus as hereinbefore defined in combination with a lifting actuator and hopper inlet for locating an intermediate bulk container outlet.

Apparatus embodying the invention is hereinafter described, by way of example, with reference to the accompanying drawings.

FIG. 1 is a plan view of apparatus according to the invention;

FIG. 2 is a side elevational view of the apparatus of FIG. 1;

FIG. 3 is a transverse sectional view of the apparatus of FIG. 1 taken on the line 3—3 of FIG. 2;

FIG. 4 is a longitudinal sectional view of the apparatus of FIG. 1, taken on the line 4—4 of FIG. 1;

FIGS. 5A to 9A show in plan operational modes of the apparatus of FIGS. 1 to 4 during use as shown in FIGS. 5 to 9.

Figure 5:
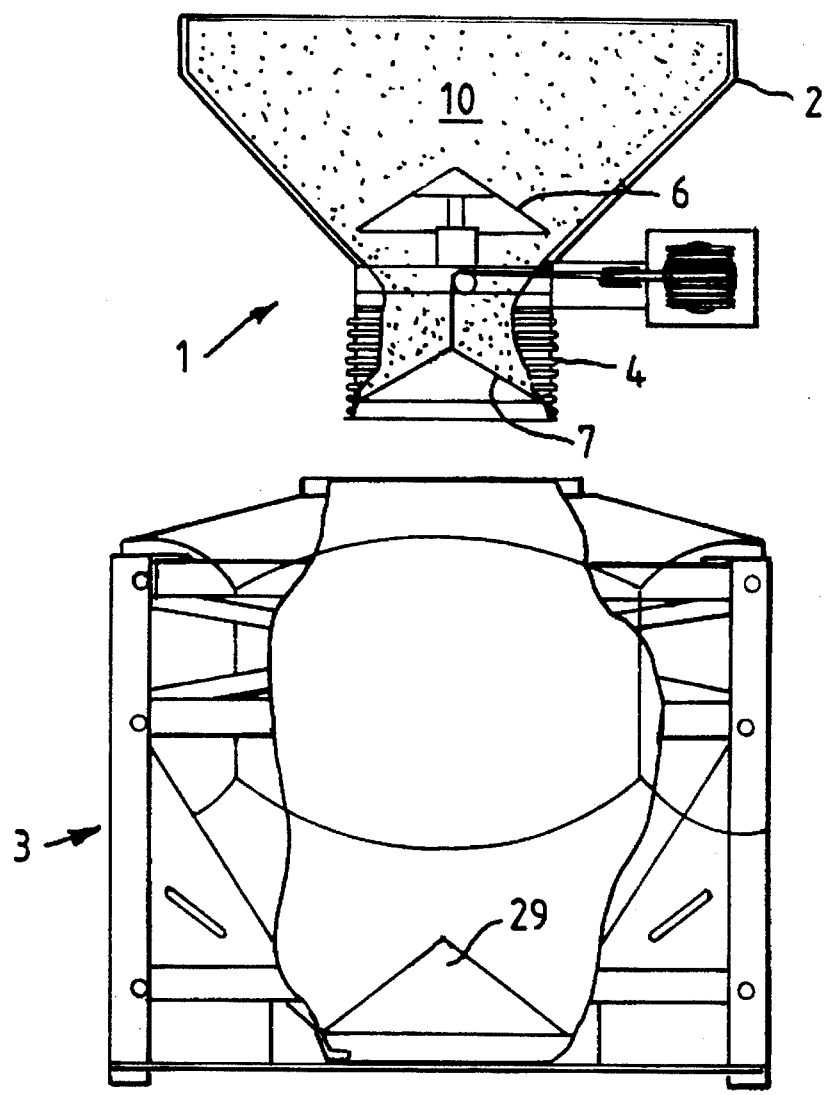
FIG. 5 to 9 show respectively stages in use of the apparatus of FIGS. 1 to 4 in transferring material such as tablets from one container such as a tablet press, bulk silo or other process vessel to another container such as an IBC.

Referring to the drawings, in which like pans are referred to by like reference numerals, there is shown apparatus for transferring material from one container 2 to another 3, comprising an extensible conduit 4, means 5 to extend the conduit 4, and respective means 6, 7 to open and close an inlet 8 and outlet 9 of the conduit 4, the arrangement being such that in use the conduit 4 is extended for transfer of material, and the inlet 8 and outlet 9 are opened sequentially to pass material 10 to the conduit 4 from the one container 2 and then from the conduit 4 to the another container 3.

Figure 7:
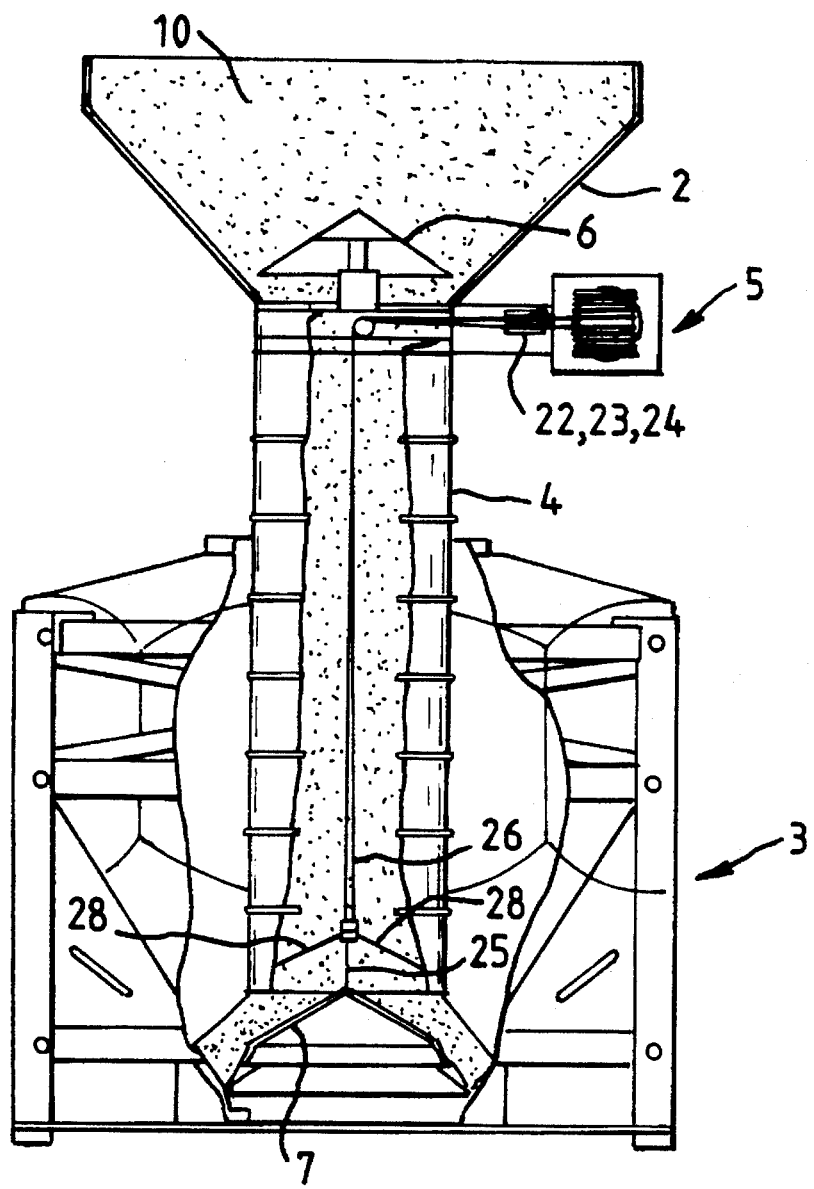

The inlet and outlet closure means 6, 7 in the embodiment each comprise a nonmetallic, for example plastic, cone valve. The cone valve have their apices in line substantially vertically in use and lying substantially along the longitudinal axis of the conduit 4, which comprises a reinforced flexible tube or piping, the outlet of which is normally closed by the lower, in use and as shown in FIG. 7, valve, the upper one 6 in use and as shown in FIG. 5, normally seating within a mouth 11 defining the inlet 8 of conduit 4. The mouth 11 is a flared flange or band which is part of a coated metal, or non-metallic cylinder 12 to which the upper end of the flexible conduit 4 is secured.

The lower end of the conduit 4 is stiffened by a wire reinforcement rim (not shown). There is an actuator 13, carried inside the upper valve 6, in the form of a piston and cylinder arrangement, and there is also a vibrator 14, though this is optional.

The cylinder 12 has a lateral extension or strut 15 which carries a platform 16 which in turn mounts the means 5 which is a control or actuator means for extending and shortening the conduit 4 and actuating the outlet valve 7. The actuator means 5 in the embodiment comprises a movable pulley block system between the sheaves 17 of which is mounted means for moving same in the form of a bellows 18, as shown a double bellows. The strut 15 carries a further actuator 19 in the form of a piston and cylinder arrangement, the piston of which is pivoted to a lever arm 20, pivoted at 21 to the strut and which carries at the end opposite the piston a pulley 22, so that the pulley 22 is movable bodily as the piston extends and retracts. The movable pulley 22 is part of a pulley system comprising two further pulleys 23, 24 which are fixed. In order to extend and shorten the conduit 4 and to open the outlet 9, there are flexible connectors in the form, in the embodiment, of nylon ropes, cords or strings 25, 26. One such cord extends from the apex of the outlet cone 10 valve, along the longitudinal axis of the conduit, over a pulley 27 and then around the pulley 24 to the sheaves 17 of the pulley block. The other cord 26 is connected at its lower (as viewed) end by three other equiangularly spaced cords 28 to the outlet rim of the conduit 4, and also passes along the longitudinal axis of the conduit 4, over the pulley 27, around the pulley 23, bodily movable pulley 22 and pulley 24 to the sheaves 17 of the pulley block.

Figure 5A:
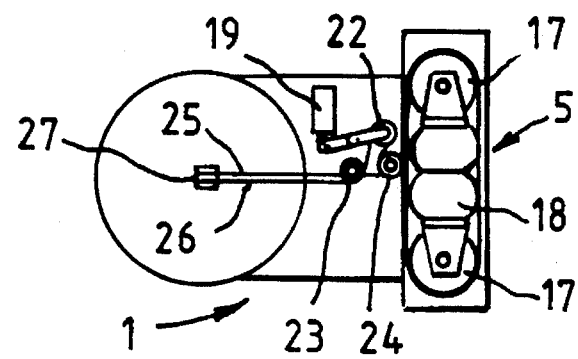

Operation of the apparatus 1 will now be described, for transfer of tablets or other friable products from say a tablet press 2 to an IBC 3, as shown in FIGS. 5 to 9A. In FIGS. 5 and 5A the apparatus 1 is clamped by the flange 11 to the outlet of the tablet press 2, and the inlet valve 6 is raised by its piston 13 thereby opening an annular passage through which the material flows to fill the interior of the conduit, which is raised to its upper or shortest extent, with the outlet valve 7 closed by the actuator means 5. In this position, the two bellows 18 are fully extended to move the sheaves 17 apart and effectively "shorten" the counter nylon ropes 25, 26. Another container 3, in the embodiment, is positioned below the outlet 9 of the apparatus 1 (FIG. 5).

Figure 6:
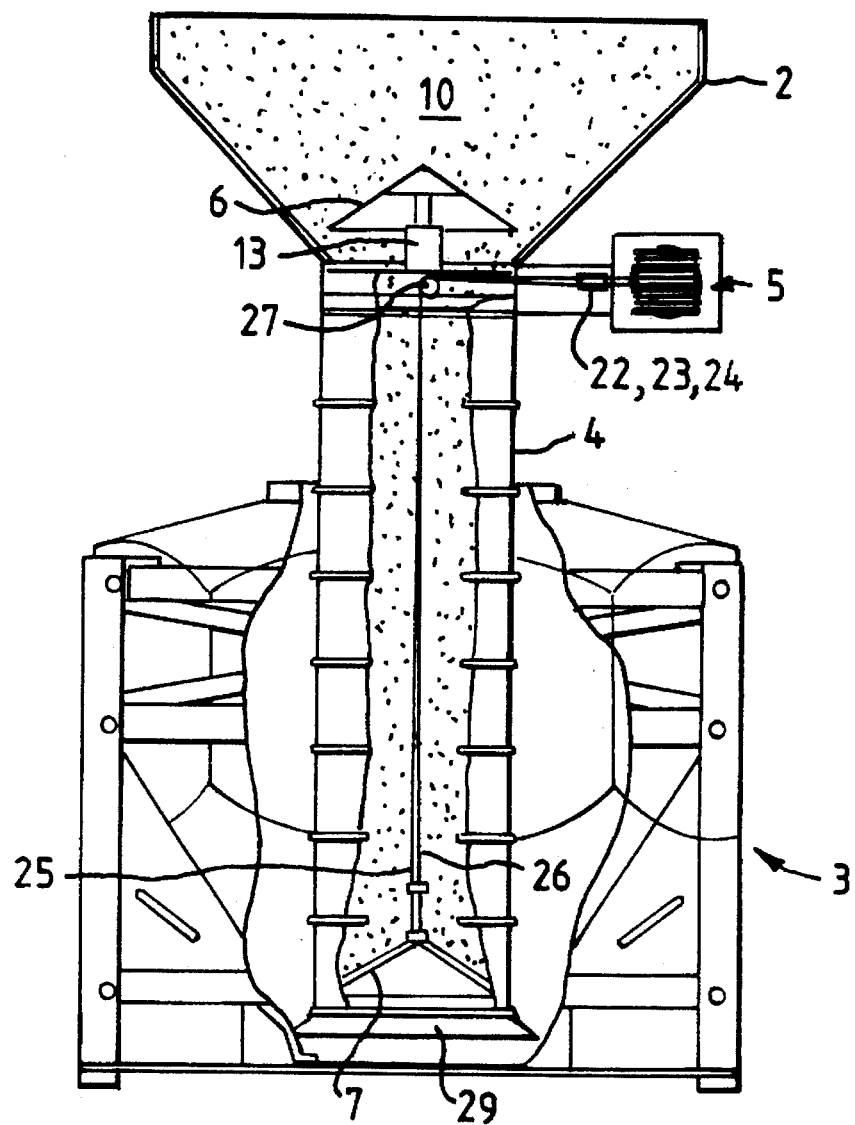
Figure 6A:
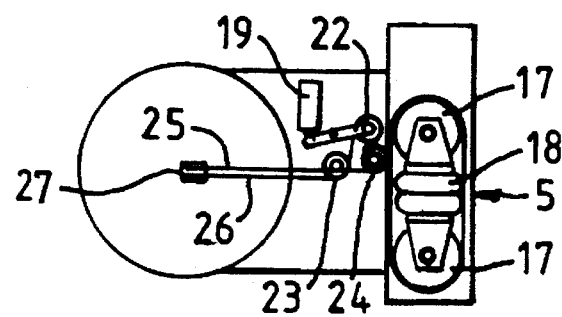

With the IBC inlet cover open, the double bellows 18 are slowly compressed to the minimum extent (FIG. 6A) thus drawing the sheaves together and thereby effectively "lengthening" the flexible connectors 25, 26 of both the conduit 4 and outlet valve 7 which gently lower together directly to the bottom of the IBC so that the outlet valve 7 seats on the outlet valve 29 of the IBC 3. As the conduit 4 and outlet valve 7 are lowered, they gently carry the material 10 with them, which material 10 thus never falls through free space, as it is always resting on the outlet valve 7 and is gradually drawn through the annular gap around the inlet valve 6 while the volume increases as the conduit 4 gradually extends in a controlled manner (FIG. 6). Thus there is no damage caused to the (friable) material 10 such as tablets.

Figure 7A:
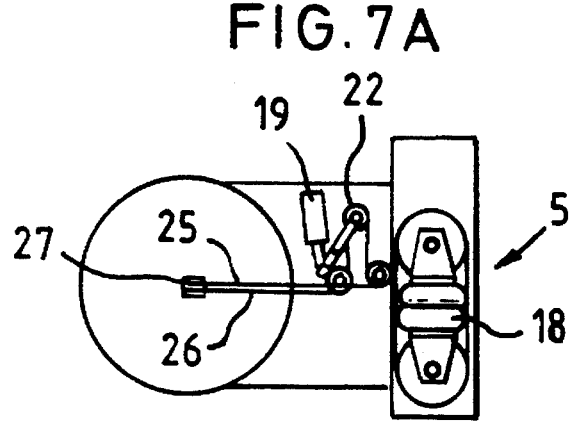

The piston of the piston cylinder arrangement 19 is then extended (FIG. 7A.), thereby moving the pulley 22 bodily, and this effectively shortens the nylon connector 26 which is connected to the rim of the conduit 4. To accommodate the "shortening", the outlet 9 of the conduit 4 rises off the valve 7, which is thus opened. With the valve 7 opened, an annular gap is formed between the outlet 9 of the conduit 4 and the outlet valve 7. Material 10 then flows under gravity through the annular gap into the IBC (FIG. 7).

After a certain amount of flow (which is directly from the one container 2 to the another container 3 via the conduit 4) the flow will cease as the material 10 clogs or chokes the outlet area adjacent the outlet 9 of the conduit 4.

Figure 8:
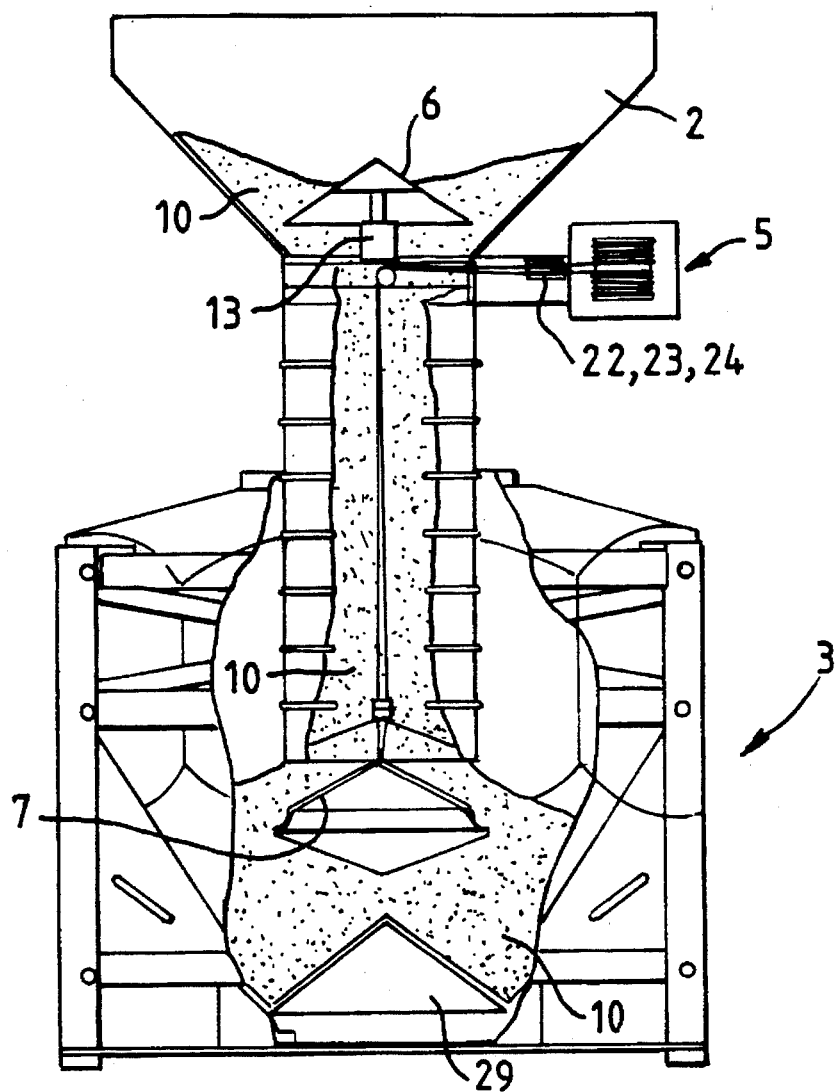
Figure 8A:
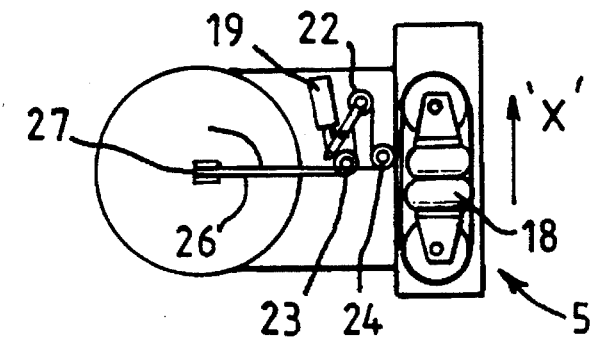

Therefore, the bellows means 18 is actuated to expand slowly in the direction of arrow 'X', FIG. 8A, thereby gently raising both the conduit 4 and the lower valve 7 whilst maintaining the open condition of the outlet 9 of the conduit 4 (FIG. 8). During this gentle and slow raising of the conduit 4 and outlet valve 7, material 10 continues to flow into the IBC 3, which is thus filled to the desired level. There is no damage to the material 10, because as the slow raising takes place, the material 10 gently passes out through the annular gap between the outlet 9 and the outlet valve 7 on to the gradually rising top surface of the material 10 in the IBC 3. In this way, the IBC 3 is either completely filled, or filled to a desired level.

Figure 9:
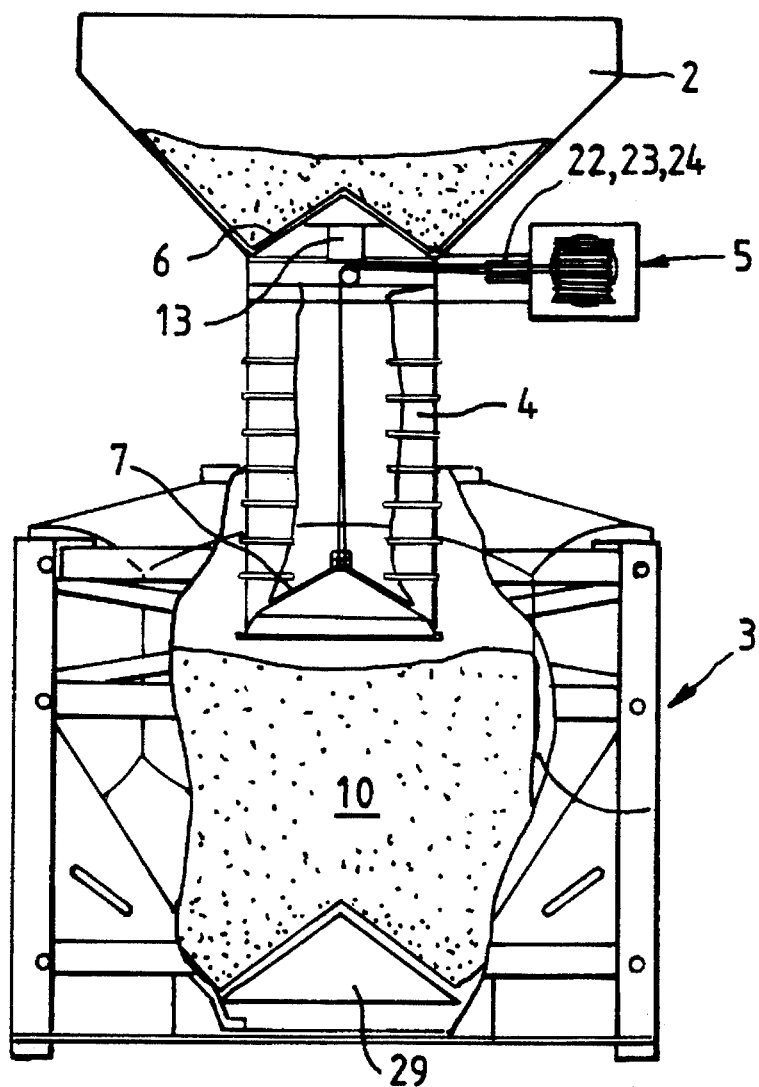
Figure 9A:
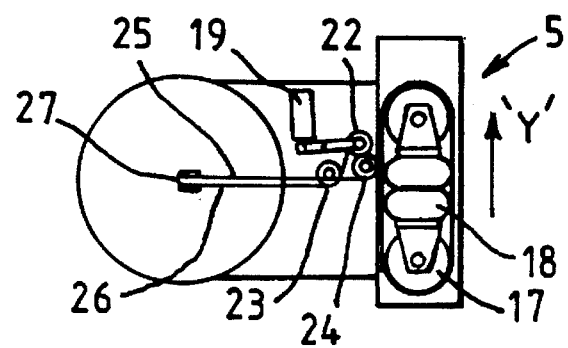

When the desired amount of filling of the IBC 3 has been achieved, the inlet valve 6 is closed by suitable actuation of its piston/cylinder arrangement 13. The flow of material from the one container 2 is ceased. After a time delay to allow all the material to pass out of the conduit 4, the piston/cylinder 19 is activated to retract its piston, so returning the pulley 22 to its initial position by effectively lengthening the nylon connector 26 for the conduit 4, which is thus lowered and repositioned on the outlet valve 7, to close the annular gap between the outlet 9 and the valve 7 (FIG. 9). The bellows 18 continues to expand in the direction of arrow 'Y', FIG. 9A, so moving the sheaves 18 apart and raising the conduit 4 and outlet valve 7 together until they are fully raised and withdrawn from the IBC (FIG. 5) so that the IBC 3 can be removed for further handling.

Various applications of the invention in addition to that described above will be apparent to those skilled in the art. For example, the apparatus 1 may be used at a discharge station for an IBC which is then the one container 2. The IBC is positioned over the apparatus at the discharge station, and lowered thereonto so the IBC cone valve is slowly raised to feed material into a discharge hopper and chute, which hopper is coated metal or non-metallic. In such an arrangement, a lip seal is preferably provided at the discharge station for cooperation with a lip seal at the IBC outlet.

In yet another embodiment, the apparatus I can be combined with a central lifting actuator and hopper inlet so that a container such as an IBC can be located onto it, full of material in the form, say, of tablets of friable free flowing product. In such an arrangement, the apparatus can lift a cone valve of the IBC to allow the product to fall a very short distance into the unextended conduit 4, so that thereafter the IBC can be emptied, as described previously, into another process vessel or IBC.

It will also be understood, of course, that the apparatus 1 can be modified. For example, although piston and cylinder arrangement 13 and bellows means 18 have been described as actuators, any suitable actuator means can be used, such as electric drive motors, air motors, or linear motors.

I claim:

1. Apparatus for transferring material from one container to another, comprising:

an extensible conduit;

extension means mounted on a mounting portion of the apparatus to extend the conduit, said extension means including a pulley block, and an actuator for moving sheaves of the block towards and away from each other for adjusting positions of the conduit outlet and the outlet valve respective flexible connectors;

first flow control means, including an inlet valve disposed at an inlet of the conduit, to open and close the inlet; and second flow control means, including an outlet valve disposed at an outlet of the conduit, to open and close the outlet;

the apparatus being such that the inlet valve is operated to pass material to the conduit from the one container, the conduit is extended, and then the outlet valve is operated to pass material from the conduit to the another container.

2. Apparatus as defined in claim 1, wherein portions of the flexible connectors lie substantially along a longitudinal axis of the conduit.

3. Apparatus as defined in claim 1, wherein the flexible connector for the conduit outlet comprises three equiangularly arranged connectors connected between a substantially rigid rim of the outlet and a portion of that flexible connector lying substantially along a longitudinal axis of the conduit.

4. Apparatus as defined in claim 3, wherein the rim is wire reinforced.

5. Apparatus as defined in claim 1, wherein the flexible connectors comprise respective elongate nylon members.

6. Apparatus as defined in claim 1, wherein the flexible connector for the conduit outlet passes around a pulley which is adjustable in position to shorten that connector and raise the outlet from the outlet valve.

7. Apparatus as defined in claim 6, wherein the pulley is connected to a further actuator for positional adjustment.

8. Apparatus as defined in claim 6, wherein the pulley is connected to a further actuator comprising a piston and cylinder mechanism.

9. Apparatus as defined in claim 1, wherein the actuator for the pulley block comprises a bellows means.

10. Apparatus as defined in claim 1, wherein the actuator for the pulley block comprises a double bellows.

11. Apparatus for transferring material from one container to another, comprising:

an extensible conduit;

extension means mounted on a mounting portion of the apparatus to extend the conduit;

first flow control means, including an inlet valve disposed at an inlet of the conduit, to open and close the inlet; and second flow control means, including an outlet valve disposed at an outlet of the conduits, to open and close the outlet, said second flow control means including means to maintain the outlet valve at desired position and to raise the conduit from the outlet valve to open a discharge opening therebetween;

the apparatus being such that the inlet valve is operated to pass material to the conduit from the one container, the conduit is extended, and then the outlet valve is operated to pass material from the conduit to the another container.

12. Apparatus as defined in claim 11, wherein the conduit comprises a reinforced flexible piping.

13. Apparatus as defined in claim 12, wherein there is provided adjacent the inlet, flange means for connection of the inlet with an outlet of the one container.

14. Apparatus as defined in claim 11, wherein the inlet and outlet valves are cone valves.

15. Apparatus as defined in claim 14, wherein the cone valves are non-metallic.

16. Apparatus as defined in claim 14, further comprising an actuator to move the inlet valve for opening and closing the inlet.

17. Apparatus as defined in claim 16, wherein the actuator comprises a piston and cylinder mechanism.

18. Apparatus as defined in claim 11, positioned between an outlet of the one container and an inlet of the another container.

19. Apparatus as defined in claim 18, wherein the another container is a transportable container.

20. Apparatus as defined in claim 18, wherein the one container is a transportable container.

\* \* \* \* \*